(12) United States Patent
Bohling et al.

(10) Patent No.: US 9,528,023 B2
(45) Date of Patent: Dec. 27, 2016

(54) AMPHOTERIC POLYMER PARTICLES AND COMPOSITIONS THEREOF

(71) Applicants: Rohm and Haas Company, Philadelphia, PA (US); Dow Global Technologies LLC, Midland, MI (US)

(72) Inventors: James C. Bohling, Lansdale, PA (US); Ward Thomas Brown, North Wales, PA (US); Arnold S. Brownell, Lansdale, PA (US); Paul Clark, Midland, MI (US); Thomas Glenn Madle, Flourtown, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 15 days.

(21) Appl. No.: 14/650,875

(22) PCT Filed: Dec. 11, 2013

(86) PCT No.: PCT/US2013/074230
§ 371 (c)(1),
(2) Date: Jun. 10, 2015

(87) PCT Pub. No.: WO2014/093412
PCT Pub. Date: Jun. 19, 2014

(65) Prior Publication Data
US 2015/0307733 A1 Oct. 29, 2015

Related U.S. Application Data

(60) Provisional application No. 61/736,931, filed on Dec. 13, 2012.

(51) Int. Cl.
| | | |
|---|---|---|
| C09C 1/36 | (2006.01) | |
| C09D 133/12 | (2006.01) | |
| C09D 5/00 | (2006.01) | |
| C09D 7/00 | (2006.01) | |
| C09D 7/12 | (2006.01) | |
| C08K 9/02 | (2006.01) | |

(52) U.S. Cl.
CPC ............... *C09D 133/12* (2013.01); *C09D 5/00* (2013.01); *C09D 7/00* (2013.01); *C09D 7/1225* (2013.01); *C08K 9/02* (2013.01)

(58) Field of Classification Search
CPC ........... C09D 133/12; C09D 5/00; C09D 7/00; C09D 7/1225; C08K 9/02
USPC ........ 524/786, 807; 106/436, 427, 443, 462, 106/503
See application file for complete search history.

(56) References Cited

U.S. PATENT DOCUMENTS

| | | | | |
|---|---|---|---|---|
| 5,385,960 | A * | 1/1995 | Emmons ................ | B82Y 30/00 523/200 |
| 6,080,802 | A | 6/2000 | Emmons et al. | |
| 6,492,451 | B1 * | 12/2002 | Dersch .................. | C03C 17/009 524/430 |
| 6,576,051 | B2 * | 6/2003 | Bardman ........... | C09D 151/003 106/427 |
| 7,179,531 | B2 | 2/2007 | Brown et al. | |
| 2008/0146724 | A1 * | 6/2008 | Bohling .................... | C08F 2/22 524/500 |

FOREIGN PATENT DOCUMENTS

| | | |
|---|---|---|
| EP | 0625541 A2 | 11/1994 |
| EP | 1209191 A2 | 5/2002 |
| EP | 1932862 A1 | 6/2008 |
| WO | 9312183 A1 | 6/1993 |
| WO | 9925780 A1 | 5/1999 |
| WO | 2012166830 A1 | 12/2012 |

* cited by examiner

*Primary Examiner* — Kelechi Egwim
(74) *Attorney, Agent, or Firm* — Reid S. Willis

(57) ABSTRACT

The present invention relates to a stable aqueous dispersion of multiphase amphoteric polymer particles comprising a crosslinked polymer phase comprising structural units of a phosphorus acid monomer, a carboxylic acid monomer, a multiethylenically unsaturated monomer, and an ethylenically unsaturated nonionic monomer; and a second polymer phase comprising a carboxylic acid monomer and an ethylenically unsaturated nonionic monomer. The present invention also relates to composites of the particles and pigment particles such as $TiO_2$. The composition is useful for preparing dried coatings with improved hiding.

9 Claims, No Drawings

AMPHOTERIC POLYMER PARTICLES AND COMPOSITIONS THEREOF

BACKGROUND OF THE INVENTION

This invention relates to amphoteric polymer particles having select acid functional groups. In particular, the polymer particles are useful for preparing composite particles, which comprise inorganic particles, each having amphoteric polymer particles in contact therewith. The invention further relates to an aqueous composition comprising the composite particle. The present invention is suitable for preparing dried coatings.

Opacifying pigments provide whiteness, and opacity or "hiding", to opacifying coatings, such as paints. These pigments are present in all coatings that are designed to provide an opaque coating on an undersurface or substrate surface to which the coating is applied. Opacifying pigments are absent from those coatings that are designed to be clear or transparent.

It is desirable that opacifying coatings have a high opacifying capacity to completely conceal the undersurface, while using a minimal application of the coating. It is highly desirable that complete covering of the undersurface is attained with a single application of the coating or paint, having the minimum possible thickness.

Opacifying coating manufacturers have long sought to formulate opacifying coatings having the desired opacity by maximizing the level of hiding for a defined level of opacifying pigment to minimize the amount of opacifying pigment utilized.

The opacifying capacity or hiding power of an opacifying coating is a measure of the coating's ability to conceal a surface to which the coating is applied. Opacifying capacity is a function of the spacing between the particles of opacifying pigment in the dried applied coating, and is maximized when the light scattering capability of the opacifying pigment is maximized. Maximum light scattering efficiency occurs when the opacifying pigment particles have a certain diameter and spacing, so that the light scattering capability of each particle does not interfere with the light scattering capability of its neighboring particles. This condition may occur in coatings containing sufficiently low levels of opacifying pigment such that the individual opacifying pigment particles are isolated from each other. Coatings containing such low levels of opacifying pigment, however, do not provide sufficient whiteness and hiding at typical dried coating thicknesses. Achieving the desired levels of hiding and whiteness typically requires higher levels of opacifying pigment. At these higher levels, a statistical distribution of opacifying pigment particles occurs, which results in at least some of the opacifying pigment particles being in such close proximity to each other so as to produce a loss of light scattering efficiency due to crowding of the opacifying pigment particles.

Increased hiding efficiency is obtained by reducing the crowding of the opacifying pigment particles and minimizing the formation of clusters of opacifying pigment particles. One method uses polymer particles containing select chemical groups that promote adsorption to the opacifying pigment particle.

For example, U.S. Pat. No. 7,179,531 discloses an aqueous dispersion of composite particles that contain multiphase polymer particles adsorbed to a titanium dioxide opacifying pigment particle. The selected multistage polymer particles have dihydrogen phosphate functional groups, which promote adsorption of the selected polymeric latex particles onto the surface of the titanium dioxide particles.

Although these composite particles provide improved hiding, there is still a need to provide aqueous compositions suitable for preparing dried coatings having increased hiding. Other desired properties for the dried coatings include increased gloss and whiteness.

SUMMARY OF THE INVENTION

The present invention addresses a need in the art by providing, in a first aspect, a stable aqueous dispersion of multiphase amphoteric polymer particles comprising:
a) a crosslinked polymer phase comprising, based on the weight of the crosslinked polymer phase:
  i) from 1 to 10 weight percent structural units of a phosphorus acid monomer or a salt thereof;
  ii) from 0.5 to 10 weight percent structural units of a carboxylic acid monomer or a sulfur acid monomer or a salt thereof or a combination thereof;
  iii) from 1 to 10 weight percent amine groups or salts thereof or quaternary ammonium salts;
  iv) 0.1 to 20 weight percent structural units of a multiethylenically unsaturated monomer; and
  v) from 80 to 97 weight percent structural units of an ethylenically unsaturated nonionic monomer; and
b) a second polymeric phase comprising:
  i) from 0.1 to 10 weight percent structural units of a carboxylic acid monomer or a sulfur acid monomer or a salt thereof or combination thereof; and
  ii) from 80 to 99.9 weight percent structural units of an ethylenically unsaturated nonionic monomer;
wherein the crosslinked polymer phase protuberates from the second polymer phase; wherein the weight:weight ratio of the crosslinked polymer phase to the second polymer phase is in the range of from 1:4 to 1:99; with the proviso that the multiphase amphoteric polymer particles comprise from 0.01 to 4 weight percent structural units of the phosphorus acid monomer or a salt thereof and from 0.01 to 4 weight percent of the amine groups or salts thereof or the quaternary ammonium salt groups.

The composition of the present invention is useful for preparing composite particles with improved adsorption and dried coatings with improved hiding.

DETAILED DESCRIPTION OF THE INVENTION

In a first aspect, the present invention is a stable aqueous dispersion of multiphase amphoteric polymer particles comprising:
a) a crosslinked polymer phase comprising, based on the weight of the crosslinked polymer phase:
  i) from 1 to 10 weight percent structural units of a phosphorus acid monomer or a salt thereof;
  ii) from 0.5 to 10 weight percent structural units of a carboxylic acid monomer or a sulfur acid monomer or a salt thereof or a combination thereof;
  iii) from 1 to 10 weight percent amine groups or salts thereof or quaternary ammonium salts;
  iv) 0.1 to 20 weight percent structural units of a multiethylenically unsaturated monomer; and
  v) from 80 to 97 weight percent structural units of an ethylenically unsaturated nonionic monomer; and b) a second polymeric phase comprising:
   i) from 0.1 to 10 weight percent structural units of a carboxylic acid monomer or a sulfur acid monomer or a salt thereof or combination thereof; and
   ii) from 80 to 99.9 weight percent structural units of an ethylenically unsaturated nonionic monomer;

wherein the crosslinked polymer phase protuberates from the second polymer phase; wherein the weight:weight ratio of the crosslinked polymer phase to the second polymer phase is in the range of from 1:4 to 1:99; with the proviso that the multiphase amphoteric polymer particles comprise from 0.01 to 4 weight percent structural units of the phosphorus acid monomer or a salt thereof and from 0.01 to 4 weight percent of the amine groups or salts thereof or the quaternary ammonium salt groups.

As used herein, "multiphase" refers to amphoteric polymer particles that have at least two phases. Preferably, the multiphase amphoteric particles are biphasic.

As used herein, the term "structural unit" of the named monomer, refers to the remnant of the monomer after polymerization. For example, a structural unit of methyl methacrylate is as illustrated:

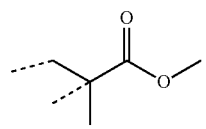

structural unit of methyl methacrylate
where the dotted lines represent the points of attachment of the structural unit to the polymer backbone.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

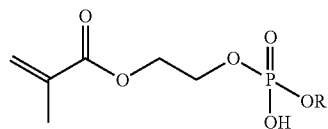

where R is H or

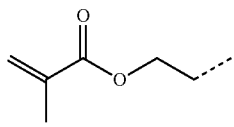

A preferred phosphonate is 2-methacroylylethyl phosphonic acid (MEP) and salts thereof.

A preferred concentration of structural units of PEM of MEP in the crosslinked polymer is from 3 to 8 weight percent, based on the weight of the crosslinked polymer.

Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, and salts thereof. Preferably, a carboxylic acid monomer is used to prepare the crosslinked polymer, more preferably acrylic acid or methacrylic acid. A preferred concentration of structural units of acrylic or methacrylic acid is from 0.5 to 5 weight percent, based on the weight of the crosslinked polymer.

The multiethylenically unsaturated monomer contains at least two ethylenically unsaturated groups, examples of which include di- and triethylenically unsaturated monomers including as allyl methacrylate, tripropylene glycol dimethacrylate, diethylene glycol dimethacrylate, ethylene glycol dimethacrylate, 1,6-hexanediol dimethacrylate, 1,3-butylene glycol dimethacrylate, polyalkylene glycol dimethacrylate, diallyl phthalate, trimethylolpropane trimethacrylate, divinylbenzene, divinyltoluene, trivinylbenzene, divinylnaphthalene, and diesters or triesters of phosphoric acid wherein each ester group is ethylenically unsaturated, such as phosphodi(ethyl methacrylate), which has the structure $[CH_2=C(CH_3)C(O)OCH_2CH_2O]_2P(O)OH$. Preferably structural units of the multiethylenically unsaturated monomer are present in the crosslinked polymer at a concentration of from 0.2 to 10 weight percent, based on the weight of the crosslinked polymer. Preferred multiethylenically unsaturated monomers include allyl methacrylate and divinyl benzene.

The crosslinked polymer and the second polymer are conveniently formed by the polymerization of ethylenically unsaturated monomers using a multistage emulsion polymerization process. In a first stage, the crosslinked polymer portion (also known as the core) is advantageously prepared by aqueous emulsion or suspension polymerization of
a) a phosphorus acid monomer; b) a carboxylic acid or sulfur acid containing monomer;
c) a compound that imparts amine or quaternary ammonium salt functionality or a group convertible to the amine or quaternary ammonium salt into the polymer;
d) a multiethylenically unsaturated monomer; and e) an ethylenically unsaturated nonionic monomer.

Amine or quaternary ammonium salt functionality can be imparted into the crosslinked polymer in a variety of ways. For example, an amine-containing monomer such as dimethylaminoethyl methacrylate (DMAEMA), dimethylaminopropyl methacrylamide, dimethylaminopropyl acrylamide, tert-butylaminoethyl methacrylate, and tert-butylaminoethyl acrylate can be used to prepare the crosslinked polymer. Examples of quaternary ammonium salts suitable for incorporation into the crosslinked polymer include (vinylbenzene)trimethylammonium chloride, [2-(methacryloyloxy)ethyl]trimethylammonium chloride, and sulfopropylbetaine methacrylate (SBMA). Where the monomer contains both amine or quaternary ammonium salt functionality and acid functionality (as in the case of SBMA), it is understood that the carboxylic acid monomer or sulfur acid monomer and the amine or quaternary ammonium salt are part of the same compound or monomer.

Alternatively, a nitrogen-containing chain transfer agent (CTA) or initiator can be used to impart amine or quaternary ammonium salt functionality into the crosslinked polymer. Examples of suitable CTAs include aminomercaptans such as 2-aminoethanethiol, 2-dimethylaminoethanethiol, 2-diethylaminoethanethiol, 1-amino-2-methyl-2-propanethiol, 2-aminothiophenol, 3-aminothiophenol, 4-aminothiophenol, and 2-(butylamino)ethanethiol, and salts thereof; and halogenated amines such as 2,2,2-trichloroethylamine and (3,3, 3-tribromopropyl)dimethylamine and salts thereof; examples of suitable initiators include 2,2'-azobis(N,N'-dimethyleneisobutyramidine) and salts thereof, and 2,2'-azobis(2-amidino-propane) and salts thereof.

Moreover, amine or quaternary ammonium salt functionality can be imparted by copolymerization of a non-amine containing monomer, such as methacrylic anhydride, followed by post-polymerization functionalization with a diamine such as N,N-dimethylpropane-1,3-diamine.

Preferably, amine functionality is imparted into the crosslinked polymer by use of a chain transfer agent, preferably 2-aminoethanethiol.

Crosslinking need not require the use of conventional multiethylenically unsaturated monomers. Alternatively, crosslinking can be achieved, for example, by the reaction of functional groups in the polymer after the polymerization of the first stage is completed and prior to the formation of the second polymer. An example of such post reaction is the reaction of isocyanate groups with polyamine groups.

In a second stage, the second polymer is advantageously polymerized from a second monomer mixture that comprises a carboxylic acid monomer and an ethylenically unsaturated nonionic monomer.

It is preferred that the amount of phosphorus acid monomer and the amine or quaternary ammonium salt-containing monomer or nitrogen-containing CTA or initiator (i.e., the nitrogen-containing compound) present in the second monomer mixture is not more than 10 mole percent of the phosphorus acid monomer present in the first stage. By way of example, if the amount of phosphorus acid monomer is the first stage is 10 mmol, the total of phosphorus acid monomer and amine compound in the second monomer mixture preferably does not exceed 1 mmol.

The crosslinked polymer and second polymer include structural units of ethylenically unsaturated nonionic monomers such as styrene, α-methyl styrene, vinyl toluene, ethylene, propylene, vinyl acetate, vinyl versatate, acrylonitrile, acrylamide, acrylates and methacrylates including methyl methacrylate, ethyl methacrylate, ethyl acrylate n-butyl acrylate, 2-ethylhexyl acrylate.

A polymerization initiator is typically added to the aqueous reaction medium to initiate polymerization of the ethylenically unsaturated monomers. Examples of suitable polymerization initiators include polymerization initiators that thermally decompose at the polymerization temperature to generate free radicals. Polymerization initiators can be used alone or as the oxidizing component of a redox system, which also includes a reducing component. Examples of redox catalyst systems include t-butyl hydroperoxide/isoascorbic acid/Fe(II), and ammonium persulfate/sodium bisulfite/sodium hydrosulfite/Fe(II).

The multi-stage process for preparing the multistage amphoteric polymer particles typically contains a nonionic or anionic surfactant, or a combination thereof, to stabilize the growing polymer particles during polymerization and to discourage aggregation of the polymer particles in the resulting aqueous polymer dispersion. It is preferred that a combination of a nonionic and an anionic surfactant are used to prepare the crosslinked polymer stage; it is more preferred that an excess of the nonionic surfactant with respect to the anionic surfactant is used, preferably at a weight-to-weight ratio of from 2:1 to 5:1. It is also preferred that a combination of nonionic and anionic surfactant is used to prepare the second polymer stage.

The crosslinked polymers of the multistage polymer particles preferably have an average diameter particle size by dynamic light scattering in the range of 40 nm, more preferably from 55 nm, to 90 nm, more preferably to 75 nm, and the multistage polymer particles have an average diameter particle size in the range of 110 nm, more preferably from 125, to 190 nm, more preferably to 160 nm.

Examples of suitable nonionic surfactants include alkyl phenol alkoxylates such as octyl phenol ethoxylates and secondary alcohol ethoxylates. Examples of suitable anionic surfactants include fatty alcohol polyglycol ether sulfates.

The ratio of the weight of the crosslinked polymer to the second polymer is from 1:1 to 1:99, preferably from 1:4 to 1:35.

The amphoteric polymer particles adhere to the surface of pigment particles to form composite particles. It is believed that the localization of adsorbing amine and phosphorus acid groups on the protuberating core portion of the multiphase amphoteric acorn particles increases the efficiency of adsorption of the polymer particles onto the pigment particles. The multiphase amphoteric polymer particles can therefore be envisioned as having a surface divided between a single "active" region, which has groups that are capable of adsorbing to the pigment particles, and an "inactive" region, which is preferably free or substantially free of the requisite amine and phosphorus acid groups needed to adsorb or otherwise contact the inorganic particle.

The second aspect of the present invention relates to a composite comprising an aqueous dispersion of inorganic pigment particles adhering to multiphase amphoteric polymer particles.

In one aspect, pigment particles having nonspherical shapes have average diameters by scanning electron microscopy (SEM), defined as their maximum dimension, of not greater than 1 μm, in another aspect not greater than 500 nm, and in another aspect not greater than 300 nm. In a further aspect, pigment particles having nonspherical shapes have number average diameters not less than 100 nm, in another aspect, not less than 150 nm, and in another aspect not less than 200 nm.

Examples of suitable pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are rutile titanium dioxide treated with alumina.

The composite particle is conveniently prepared by first contacting an aqueous medium containing a dispersion of inorganic particles with the aqueous composition containing the dispersed multiphase amphoteric polymer particles and, optionally, a dispersant. Next, the multiphase amphoteric polymer particles are allowed sufficient time to adhere to the pigment particles to form the composite particles.

Other optional components may be included in the formation of the composite particle, provided these components do not substantially inhibit or substantially interfere with the contact of the multistage amphoteric polymer particles with the inorganic particle. Examples of other components include co-solvents; wetting agents; defoamers; surfactants; biocides; other copolymers; and other pigments. Preferably the composite particle is formed in an aqueous medium in the absence of other co-polymers and other pigments. Optionally, the composite particle is prepared with levels of dispersant up to 2 weight %, based on the weight of the pigment particle. Suitable dispersants include anionic polyelectrolyte dispersants such as co-polymerized maleic acid, co-polymers including co-polymerized acrylic acid, co-polymers including co-polymerized methacrylic acid, and the like; and carboxylic acids containing molecules such as tartaric acid, succinic acid, and citric acid.

Alternatively, the composite particles containing the multistage amphoteric polymer particles can be prepared by dispersing dry inorganic particles into the second aqueous medium containing the multistage amphoteric polymer particles. Typically, high shear mixing is used to disperse the inorganic particles.

It is preferred that the aqueous dispersion of inorganic particles is added to the aqueous dispersion of multiphase amphoteric polymer particles to prevent a temporary excess of inorganic particles relative to the multistage amphoteric polymer particles, and the concomitant grit formation resulting from such excess.

The composite particles of the second aspect of the present invention are useful in aqueous compositions that are suitable for providing opaque dried coatings. These aqueous compositions contain the composite particles and a binder, which is a polymer that is film forming, or made to be film forming by use of solvents or plasticizers, at or below the drying conditions of the aqueous composition. Examples of binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof. The aqueous composition contains the binder as dispersed polymer particles, solubilized polymers, or as partially solubilized polymer particles. Preferred are aqueous compositions containing the binder as polymer particles dispersed in the aqueous medium.

Preferably, the aqueous composition of this invention has a VOC level of less than 150 g/L of the aqueous composition; more preferably the aqueous composition has a VOC level of less than 100 g/L of the aqueous composition; and even more preferably the aqueous composition has a VOC level of less than 50 g/L of the aqueous composition.

The dried coating of this invention is typically prepared by applying the aqueous composition to a substrate by conventional methods well known in the art.

The aqueous composition of this invention is suitable as a protective coating or as an aesthetic coating. Examples of suitable coatings include architectural coatings such as interior or exterior paint coatings, including masonry coatings; wood coatings and treatments; maintenance coatings such as metal coatings; paper coatings; leather coatings; polishes for leather; and traffic coatings such as those coatings used to provide markings on roads, pavements, and runways. Substrates suitable for the application of the aqueous composition include, for example, processed timber such as medium density fiber board; chip boards, and laminates; mineral substrates such as masonry, cement, fiber cement, plaster, plaster board, glazed and unglazed ceramic; metal substrates such as galvanized iron, galvanized steel, cold rolled steel, Zincalum metal, Zincalum II metal, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

Further, the aqueous compositions of the present invention typically can be formulated to a desired level of viscosity using lower levels of rheology modifiers or thickeners than aqueous compositions that do not contain the composite particles of this invention.

EXAMPLES

The following abbreviations are used in the examples:
BA butyl acrylate
MMA methyl methacrylate
PEM phosphoethyl methacrylate (60% active)
ALMA allyl methacrylate
MAA glacial methacrylic acid
2-EHA 2-ethylhexyl acrylate
APS ammonium persulfate
2-AETH 2-aminoethanethiol hydrochloride
X-405 TRITON™ X-405 Octylphenol Ethoxylate
FES 32 Disponil FES 32 surfactant
TRITON is a Trademark of The Dow Chemical Company or Its Affiliates Example 1

Amphoteric Acorn Synthesis

A nitrogen-flushed 4-necked round bottom flask equipped with a stirrer, heating mantle, and a stainless steel emulsion delivery tube was charged with the deionized water (80 mL), FES-32 (0.44 g), and X-405 (0.60 g), and stirred under $N_2$ at 80° C.

In the mean time a crosslinked core monomer emulsion (ME1) was prepared by mixing water (5.0 mL), FES-32 (0.4 g), X-405 (2.00 g), BA (6.40 g), MMA (4.80 g), MAA (0.13 g), PEM (0.48 g), and ALMA (0.24 g) in a 20-mL vial. After generating an emulsion with these materials, 2-AETH (0.175 g) was added. The emulsion mixture was shaken vigorously for 10 s, then poured into the flask. The vial was rinsed (10 mL of water), and a catalyst solution of APS (0.43 g in 2.0 mL of water) was then added to the flask, thereby creating an exotherm. After the exotherm peaked, the reactor was set to 85° C. and held for 15 min. At minute 13 of the hold, a sample was removed for crosslinked core analysis. At the completion of the hold period, a solution of FES-32 (0.76 g) and X-405 (2.40 g) in water (10.0 mL) was added to the flask and the temperature was adjusted to >80° C.

A second monomer emulsion (ME2) was prepared by mixing and emulsifying DI water (24.50 g), FES-32 (1.60 g), X-405 (2.00 g), BA (48.40 g), MMA (60.60 g), and MAA (2.23 g). ME2 was added at a rate of 0.5 mL/min with concomitant addition of a co-feed of APS (0.30 g) and ammonium hydroxide (0.60 g, 28% aqueous) in water (20.0 mL) was added the flask at a rate of 0.13 mL/min. The reaction temperature was maintained at 85° C. throughout the polymerization. Twenty min after onset of the feeds, the ME2 feed rate was increased to 1.0 mL/min. After the ME2 feed and catalyst/ammonia co-feed additions were complete, the reaction was held at 85° C. for 10 min. The flask was then cooled to a temperature of less than 50° C., whereupon iron sulfate heptahydrate (0.50 g of a 0.15% aqueous solution of $FeSO_4.7H_2O$) in water (1.0 mL) was added, followed by tert-butylhydroperoxide (0.14 g, 70% active) in water (1.0 mL) and isoascorbic acid (0.10 g) in (water 1.0 mL). Cooling was continued and at T<35° C., the latex was poured through a 100-mesh screen and characterized.

Resulting characterization showed a core size of 67.9 nm and a final latex size of 151.0 nm by dynamic light scattering. The latex contained 40.2 wt % solids and had a pH of 2.94.

Comparative Example 1

Non-Amphoteric Acorn Synthesis

A nitrogen-flushed 4-necked round bottom flask equipped with a stirrer, heating mantle, and a stainless steel emulsion delivery tube was charged with the deonized water (80 mL), FES-32 (0.44 g), and X-405 (0.60 g), and stirred under $N_2$ at 80° C.

In the mean time a crosslinked core monomer emulsion (ME1) was prepared by mixing and emulsifying water (5.0 mL), FES-32 (0.4 g), X-405 (2.00 g), BA (6.40 g), MMA (4.80 g), MAA (0.13 g), PEM (0.48 g), and ALMA (0.24 g) in a 20-mL vial. The emulsion was poured and rinsed into the flask, and a catalyst solution of ammonium persulfate (0.43 g APS in 2.0 mL of water) was then added to the flask, thereby creating an exotherm. After the exotherm peaked, the reactor was set to 85° C. and held for 15 min. At the completion of the hold period, a solution of FES-32 (0.76 g) and X-405 (2.40 g) in water (10.0 mL) was added to the flask and the temperature was adjusted to >80° C.

A second monomer emulsion (ME2) was prepared by mixing and emulsifying DI water (24.50 g), FES-32 (1.60 g), X-405 (2.00 g), BA (48.40 g), MMA (60.60 g), and MAA (2.23 g). ME2 was added at a rate of 0.5 mL/min with concomitant addition of a co-feed of APS (0.30 g) and ammonium hydroxide (0.60 g, 28% aqueous) in water (20.0 mL) was added the flask at a rate of 0.13 mL/min. The reaction temperature was maintained at 85° C. throughout the polymerization. Twenty min after onset of the feeds, the ME2 feed rate was increased to 1.0 mL/min. After the ME2 feed and catalyst/ammonia co-feed additions were complete, the reaction was held at 85° C. for 10 min. The flask was then cooled to a temperature of less than 50° C., whereupon iron sulfate heptahydrate (0.50 g of a 0.15% aqueous solution of $FeSO_4.7H_2O$) in water (1.0 mL) was added, followed by tert-butylhydroperoxide (0.14 g, 70% active) in water (1.0 mL) and isoascorbic acid (0.10 g) in water (1.0 mL). Cooling was continued and at T<35° C., the latex was poured through a 100-mesh screen and characterized.

Resulting characterization showed a crosslinked core size of 63.7 nm and a final latex size of 124.8 nm by dynamic light scattering. The latex contained 40.2 wt % solids and had a pH of 4.94.

Comparative Example 2

Acorn Synthesis Using Non-Amine Chain Transfer Agent

A nitrogen-flushed 4-necked round bottom flask equipped with a stirrer, heating mantle, and a stainless steel emulsion delivery tube was charged with the deonized water (80 mL), FES-32 (0.44 g), and X-405 (0.60 g), and stirred under $N_2$ at 80° C.

In the mean time a crosslinked core monomer emulsion (ME1) was prepared by mixing water (5.0 mL), FES-32 (0.4 g), X-405 (2.00 g), BA (6.40 g), MMA (4.80 g), MAA (0.13 g), PEM (0.48 g), and ALMA (0.24 g) in a 20-mL vial. After generating an emulsion with these materials, 2-mercaptoethanol (0.12 g) was added. The emulsion mixture was shaken vigorously for 10 seconds, then poured into the flask. The vial was rinsed, and a catalyst solution of ammonium persulfate (0.43 g APS in 2.0 mL of water) was then added to the flask, thereby creating an exotherm. After the exotherm peaked, the reactor was set to 85° C. and held for 15 min. At minute 13 of the hold, a sample was removed for crosslinked core analysis. At the completion of the hold period, a solution of FES-32 (0.76 g) and X-405 (2.40 g) in water (10.0 mL) was added to the flask and the temperature was adjusted to >80° C.

A second monomer emulsion (ME2) was prepared by mixing and emulsifying DI water (24.50 g), FES-32 (1.60 g), X-405 (2.00 g), BA (48.40 g), MMA (60.60 g), and MAA (2.23 g). ME2 was added at a rate of 0.5 mL/min with concomitant addition of a co-feed of APS (0.30 g) and ammonium hydroxide (0.60 g, 28% aqueous) in water (20.0 mL) was added the flask at a rate of 0.13 mL/min. The reaction temperature was maintained at 85° C. throughout the polymerization. Twenty min after onset of the feeds, the ME2 feed rate was increased to 1.0 mL/min. After the ME2 feed and catalyst/ammonia co-feed additions were complete, the reaction was held at 85° C. for 10 min. The flask was then cooled to a temperature of less than 50° C., whereupon iron sulfate heptahydrate (0.50 g of a 0.15% aqueous solution of $FeSO_4.7H_2O$) in water (1.0 mL) was added, followed by tert-butylhydroperoxide (0.14 g, 70% active) in water (1.0 mL) and isoascorbic acid (0.10 g) in water (1.0 mL). Cooling was continued and at T<35° C., the latex was poured through a 100-mesh screen and characterized.

Resulting characterization showed a crosslinked core size of 67.8 nm and a final latex size of 126.9 nm by dynamic light scattering. The latex contained 40.7 wt % solids and had a pH of 2.94.

Composite Data

Latexes (~51 g) from Example 1 and Comparative Examples 1 and 2 were added to separate plastic mixing buckets, and adjusted to a pH of ~8.3 with concentrated ammonium hydroxide. Kronos 4311 $TiO_2$ slurry was slowly poured into each of the three latex solutions with mixing (41.33 g of slurry into each latex solution). Water was then added to afford a 35 vol % solids mixture for each composite. The composite was stirred for 15 min, then analyzed. Adsorption of latexes to pigment was determined by centrifugation as follows: 12.00 g of water and 8.00 g of each latex/pigment composite were added to separate centrifuge tubes. After mixing the materials, the centrifuge tubes were spun at 7000 rpm for 30 min. The supernatant was pipetted from the settled material, the solids content was determined, and the percent of latex adsorbed to pigment was calculated at several time points, as shown in Table 1.

TABLE 1

Adsorption of Latexes on Pigment

| Example No. | Time | Adsorbed Latex on Pigment (wt.% latex adsorbed) |
|---|---|---|
| Example 1 | 5 min | 53.0 |
|  | 1 h | 65.3 |
|  | 3 h | 71.6 |
|  | 1 d | 77.5 |
|  | 3 d | 77.0 |
|  | 7 d | 83.7 |
| Comp. Example 1 | 5 min | 53.7 |
|  | 1 h | 62.5 |
|  | 3 h | 64.3 |
|  | 1 d | 67.1 |
|  | 3 d | 67.8 |
|  | 7 d | 67.7 |
| Comp. Example 2 | 5 min | 35.2 |
|  | 1 h | 54.4 |
|  | 3 h | 57.2 |
|  | 1 d | 59.4 |
|  | 3 d | 63.8 |
|  | 7 d | 66.2 |

The acorn latex of the present invention shows markedly improved TiO$_2$ adsorption over the non-amphoteric acorn latexes. The results of Comparative Example 2 demonstrate that the effect is not related to any differences in molecular weight since similar levels of molecular weight controlling chain transfer agent (CTA) are used in each case; the only difference is that the CTA used in Example 1 contained amine functionality.

What is claimed is:

1. A stable aqueous dispersion of multiphase amphoteric polymer particles comprising:
   a) a crosslinked polymer phase comprising, based on the weight of the crosslinked polymer phase:
      i) from 1 to 10 weight percent structural units of a phosphorus acid monomer or a salt thereof;
      ii) from 0.5 to 5 weight percent structural units of a carboxylic acid monomer or a sulfur acid monomer or a salt thereof or a combination thereof;
      iii) from 1 to 10 weight percent amine groups or salts thereof or quaternary ammonium salts;
      iv) 0.1 to 10 weight percent structural units of a multiethylenically unsaturated monomer; and
      v) from 80 to 97 weight percent structural units of an ethylenically unsaturated nonionic monomer; and
   b) a second polymeric phase comprising:
      i) from 0.1 to 4 weight percent structural units of a carboxylic acid monomer or a sulfur acid monomer or a salt thereof or combination thereof; and
      ii) from 80 to 99.9 weight percent structural units of an ethylenically unsaturated nonionic monomer;
   wherein the crosslinked polymer phase protuberates from the second polymer phase; wherein the weight:weight ratio of the crosslinked polymer phase to the second polymer phase is in the range of from 1:4 to 1:99; with the proviso that the multiphase amphoteric polymer particles comprise from 0.01 to 4 weight percent structural units of the phosphorus acid monomer or a salt thereof and from 0.01 to 4 weight percent of the amine groups or salts thereof or the quaternary ammonium salt groups.

2. The stable aqueous dispersion of claim 1 wherein the mole:mole ratio of structural units of the sum of the phosphorus acid monomer or a salt thereof and the amine groups or salts thereof or quaternary ammonium salts in the second polymeric phase, to the moles of structural units of the phosphorus acid monomer or salt thereof in the crosslinked polymer phase is not greater than 1:10.

3. The stable aqueous dispersion of claim 1 wherein the weight:weight ratio of the crosslinked polymer phase to the second polymer phase is in the range of from 1:4 to 1:35, wherein the average particle size of the crosslinked polymer by dynamic light scattering is in the range of 40 nm to 90 nm and wherein the average particle size of the multistage particles by dynamic light scattering is in the range of 110 nm to 190 nm.

4. The stable aqueous dispersion of claim 3 wherein the crosslinked polymer phase comprises from 3 to 8 weight percent structural units of phosphoethyl methacrylate or a salt thereof or 2-methacroylylethyl phosphonic acid or a salt thereof.

5. The stable aqueous dispersion of claim 4 wherein the crosslinked polymer phase comprises from 0.2 to 10 weight percent structural units of allyl methacrylate or divinyl benzene; and wherein the crosslinked polymer comprises amine groups or salts thereof that arise from a chain transfer agent.

6. The stable aqueous dispersion of claim 1 wherein the multiphase amphoteric polymer particles comprise structural units of methyl methacrylate, butyl acrylate, and methacrylic acid; phosphoethyl methacrylate or 2-methacroylylethyl phosphonic acid or a salt thereof; and amine groups arise from 2-aminoethanethiol or a salt thereof.

7. A composition comprising an aqueous dispersion of inorganic pigment particles adhering to the surfaces of the multiphase amphoteric polymer particles of any of claims 1 to 6.

8. The composition of claim 7 wherein the inorganic pigment particles are TiO$_2$ particles.

9. The composition of claim 8 wherein the TiO$_2$ particles are treated with alumina.

* * * * *